J. B. PERKINS.
AUTOMATIC VALVE.
APPLICATION FILED DEC. 7, 1907.
915,624.
Patented Mar. 16, 1909.
2 SHEETS—SHEET 1.
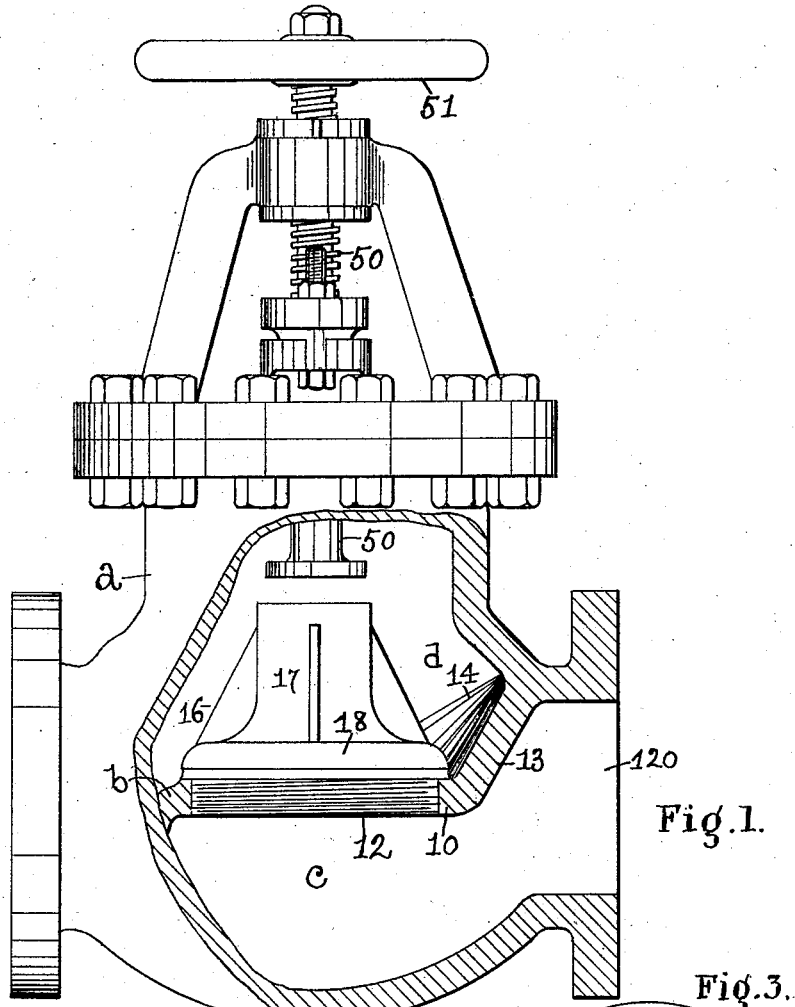
Fig.1.
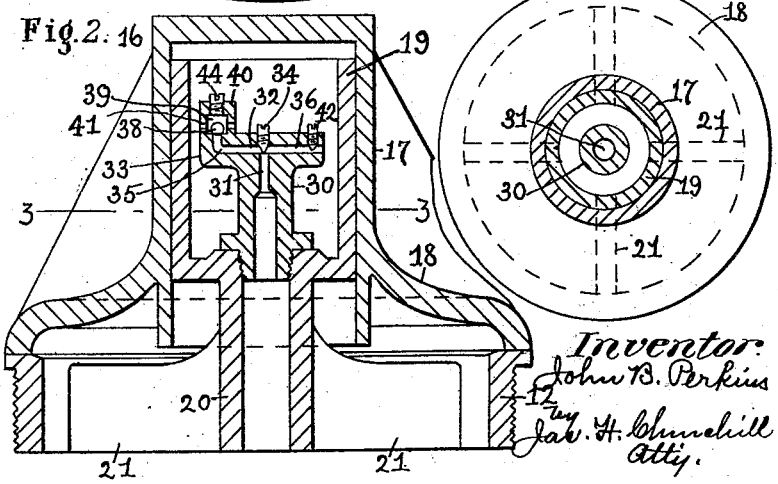
Fig.2.
Fig.3.
Witnesses.
C. H. Gannett
J. Murphy
Inventor:
John B. Perkins
by Jas. H. Churchill
Atty.

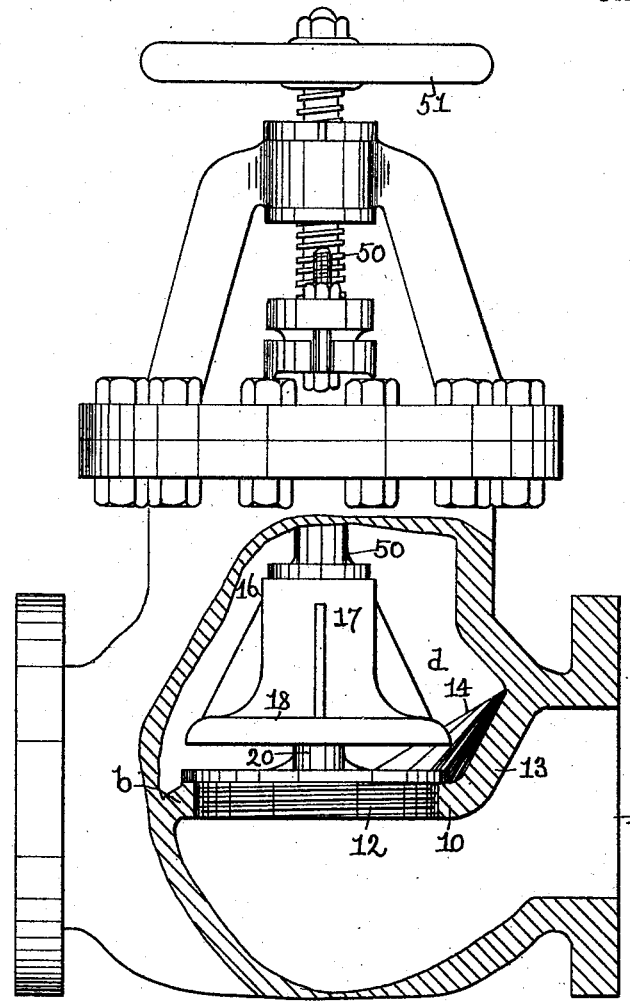
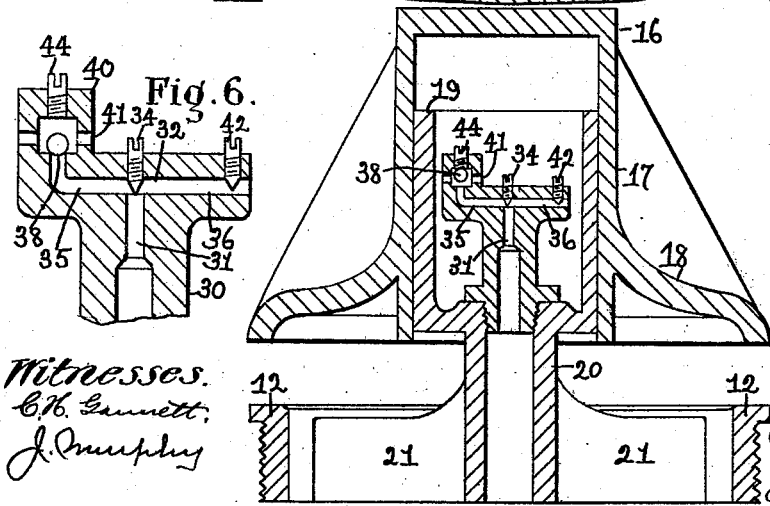

UNITED STATES PATENT OFFICE.

JOHN B. PERKINS, OF NEWTON, MASSACHUSETTS.

AUTOMATIC VALVE.

No. 915,624.　　　　Specification of Letters Patent.　　　Patented March 16, 1909.

Application filed December 7, 1907. Serial No. 405,617.

*To all whom it may concern:*

Be it known that I, JOHN B. PERKINS, a citizen of the United States, residing in Newton, in the county of Middlesex and State of Massachusetts, have invented an Improvement in Automatic Valves, of which the following description, in connection with the accompanying drawings, is a specification, like letters and figures on the drawings representing like parts.

This invention relates to an automatic stop valve especially designed and adapted for use on steam boilers, and has for its object to provide a simple and efficient valve for the purpose specified. For this purpose, I employ a bell-shaped valve having a cylindrical portion, which fits over and slides on a stationary cylinder supported by the valve seat and provided with openings in its upper and lower ends for the passage of steam into the bell-valve, as will be described. Provision is made for regulating the opening and closing of the valve as will be described. These and other features of this invention will be pointed out in the claims at the end of this specification.

Figure 1 is a partial elevation and section of an automatic valve embodying this invention, the valve being closed. Fig. 2, a detail in vertical section of the valve shown in Fig. 1. Fig. 3, a cross-section on the line 3—3, Fig. 2. Fig. 4, a view like Fig. 1 with the valve opened. Fig. 5, a vertical section of the valve in its open position, and Fig. 6, a detail on an enlarged scale to be referred to.

In the present instance I have shown the invention as embodied in a globe valve having the casing *a* provided with the partition wall *b*, separating the said casing into inlet and outlet chambers *c, d*.

The partition wall *b* is provided with a horizontal section 10 having a threaded opening into which is screwed an annular valve seat 12, and said partition wall is provided with an inclined section 13, which extends upwardly to the wall of the casing at the line 14 so as to form an enlargement within the casing *a* on the inlet side of the same, which enlargement is of greater area than the inlet port 120, so as to obtain within the valve casing a large supply or head of steam, for supplying the valve seat opening, which therefore is capable of being made larger than the inlet port 120. The valve seat 10 has coöperating with its upper surface a bell-shaped valve 16 comprising a cylindrical portion 17 and a skirt 18, said cylindrical portion being closed at its top and open at its lower end, for the reception of a stationary guiding cylinder 19 (see Fig. 2), which may be hollow and provided at its lower end as shown with a tubular extension 20 of smaller diameter, which is connected by radial arms 21 with the valve seat 12. The valve 16 is designed to be lifted from its seat when the pressure in the steam boiler (not shown) in whose steam-outlet pipe, the valve casing *a* is inserted or coupled, reaches a predetermined point.

Provision is made for regulating the time required for the valve to be opened and closed. To this end I have provided a valve mechanism for controlling the flow of steam into and out of the hollow valve. The valve mechanism comprises a substantially T-shaped casing, the vertical portion 30 of which is threaded at its lower end to engage the threaded upper end of the tubular extension 20 of the stationary cylinder. The vertical portion 30 is provided with a passage 31, which connects with a horizontal passage 32 in the horizontal portion 33 of said valve casing. The upper portion of the passage 31 is shown as of smaller diameter than the lower portion of said passage and is preferably substantially the same diameter as the horizontal passage 32. The upper portion of the passage 31 is adapted to be closed by a valve 34, shown as a needle valve, and the passage 32 extends in opposite directions from the passage 31 to form two distinct branches or ways 35, 36 from the passage 31 (see Figs. 2, 5 and 6).

The branch 35 is adapted to be automatically closed by a ball valve 38 located in a chamber 39 formed in a lug or projection 40 on the horizontal portion 33 of the valve casing, said chamber having as shown ports 41 leading into the cylinder 19. The other branch 36 is adapted to be closed by a needle valve 42. By turning the valve 34, the outlet mouth of the passage 31 may be closed more or less to regulate the flow of steam into the passage 32, and by turning the valve 42, the branch 36 can be closed more or less to regulate the flow of steam through it.

By reference to Fig. 6, it will be seen that when the ball valve 38 is lifted from its seat, the steam can flow freely through the branch 35 and ports 41 into the stationary cylinder and hollow valve, whereas the flow of steam through the branch 36 is restricted more or less according to the position of the valve 42.

The hollow valve 16 is seated as shown in Fig. 1, until the steam pressure in the chamber c exceeds a predetermined amount, say, one hundred pounds. When this occurs the steam passing through the extension 20 and passage 31 flows through both branch passages 35, 36, and the steam flowing through the passage 35 lifts the ball valve 38 and flows freely through the ports 41 into the stationary cylinder 19, which it fills and acts on the valve 16 to lift the same from its seat 10, thereby allowing the steam to flow freely through the valve casing a. The upward movement of the bell-valve 16 is limited by a stop, shown as the end of a threaded rod 50 provided with a hand wheel 51.

The bell-valve 16 remains open as represented in Fig. 4, as long as the pressure on its underside remains at the predetermined point, but when said pressure on the inlet side of the valve casing falls below the predetermined point, as for instance, by an accident to the boiler with which the valve casing a is connected, then the steam pressure on the outlet side of the valve casing acts on the bell-valve and forces it to its seat. The closing movement of the valve is resisted by the volume of steam in the cylindrical portion of the valve, which steam on the downward movement of the valve, forces the ball valve 38 to its seat, thereby closing the branch passage 35, and causing the steam in the valve to flow through the branch passage 36 into the passage 31, from which it flows through the tubular extension 20 into the inlet chamber c of the valve casing. By means of the valve 42, the branch passage 36 may be partially closed if desired to restrict the flow of steam out of the hollow valve and thereby obtain a slow closing of the valve, which avoids injury to the same and its seat.

It will be observed that there are two passages for the flow of steam into the stationary cylinder 19, which enables the valve to be opened more rapidly than it is closed, if desired; and the rate of flow into said cylinder is such as to insure a gradual opening of the valve, which prevents the same being brought up against its stop with a severe blow. If desired, the ball valve 38 may be held to its seat, and the opening and closing of the valve regulated by the needle valve 42. By means of the regulating mechanism controlling the flow of steam into and out of the hollow valve, a sensitive operating valve is obtained. By providing the inlet chamber c with an enlargement greater than the inlet port 120, the area of the valve seat, may be made larger than the area of the inlet port 120 and the friction of the steam passing through the valve is materially reduced and a freer flow of steam is obtained through the valve casing.

I have herein shown the invention as embodied in a globe valve, but it is equally well adapted to an angle valve.

Claims.

1. In a valve of the character described, in combination, a valve casing provided with an inlet and with an outlet port, a valve seat intermediate said ports, a valve bodily movable toward and from said seat and provided with a cylindrical portion closed at its upper end and open at its lower end, a stationary cylinder provided with a tubular extension supported by the valve seat, said valve sliding upon said stationary cylinder, and a regulating mechanism in said stationary cylinder, comprising a casing having a substantially vertical passage communicating with said tubular extension and a substantially horizontal passage forming branches from said vertical passage into said stationary cylinder, a valve coöperating with said vertical passage, a manually operated valve coöperating with one of said branches, and an automatic valve coöperating with the other of said branches, substantially as described.

2. In a valve of the character described, in combination, a valve casing provided with an inlet and with an outlet port, a valve seat intermediate said ports, a hollow valve bodily movable toward and from said seat, a cylindrical guide inserted into said valve and provided with a tubular extension supported by the valve seat and communicating with the inlet side of said valve casing, a valve mechanism detachably secured to said tubular extension within the cylindrical guide and having a passage of smaller diameter than said tubular extension, and a valve carried by said mechanism and coöperating with the said passage, substantially as described.

3. In a valve of the character described, in combination, a valve casing provided with an inlet and with an outlet port, a valve seat intermediate said ports, a hollow valve bodily movable toward and from said seat, a cylindrical guide inserted into said valve and provided with a tubular extension supported by the valve seat and communicating with the inlet side of said valve casing, and a valve mechanism secured to the tubular extension within the cylindrical guide and provided with valves for regulating the flow of fluid into and out of said cylindrical guide, substantially as described.

4. In a valve of the character described, in combination, a valve casing provided with an inlet and with an outlet port, a valve seat intermediate said ports, a hollow valve bodily movable toward and from said seat, a cylindrical guide inserted into said valve and provided with a tubular extension supported by the valve seat and communicating with the inlet side of said valve casing, and a valve mechanism detachably secured to the tubular extension within the cylindrical guide and provided with a manually operated valve and with an automatically operated valve for controlling the flow of fluid into and out of said cylindrical guide, substantially as described.

In testimony whereof, I have signed my name to this specification in the presence of two subscribing witnesses.

JOHN B. PERKINS.

Witnesses:
   JAS. H. CHURCHILL,
   ARTHUR H. BROWN.